H. C. DAVIS.
FEED WATER FILTER AND GREASE EXTRACTOR.
APPLICATION FILED MAR. 19, 1917.
1,249,724.
Patented Dec. 11, 1917.
2 SHEETS—SHEET 2.
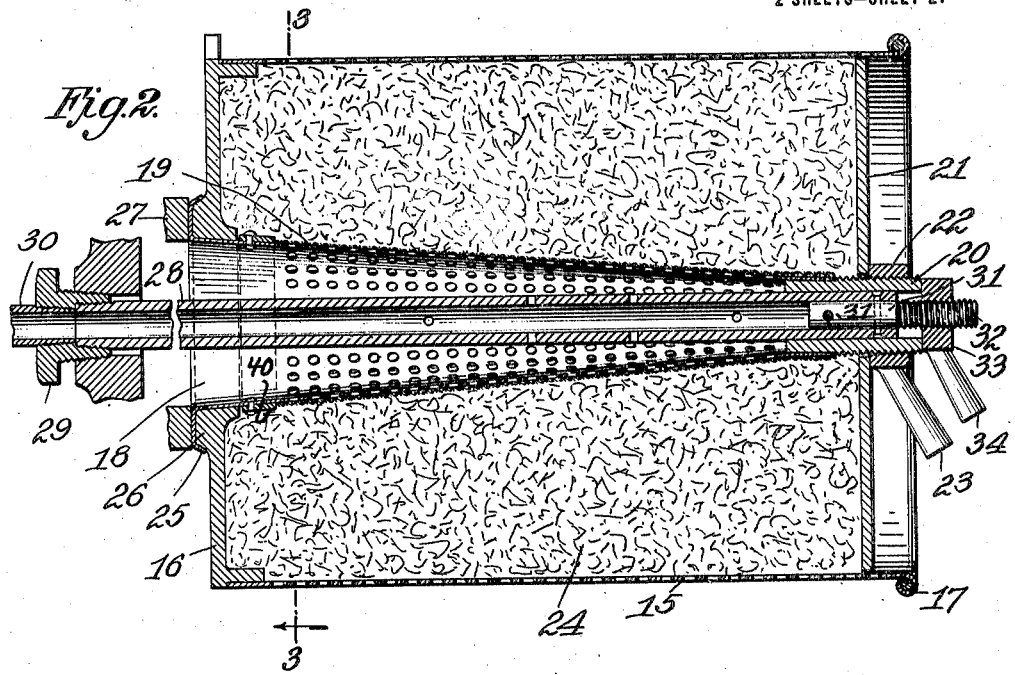
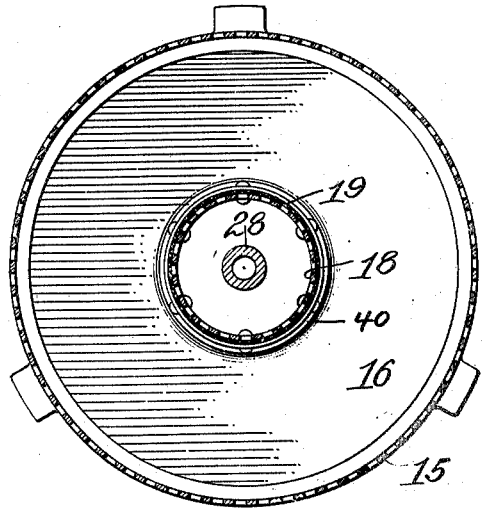
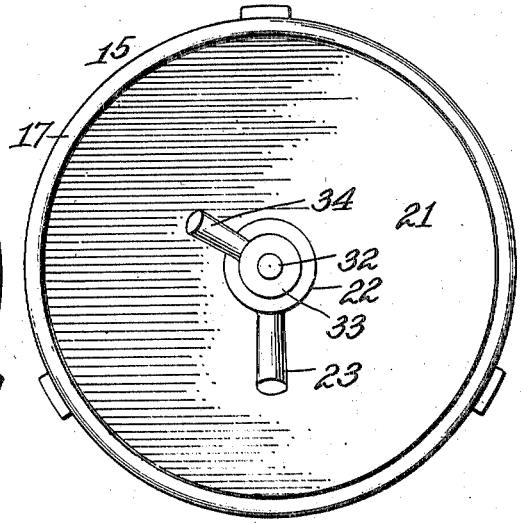
Inventor
Howard C. Davis
By his Attorney
Chas. C. Gill

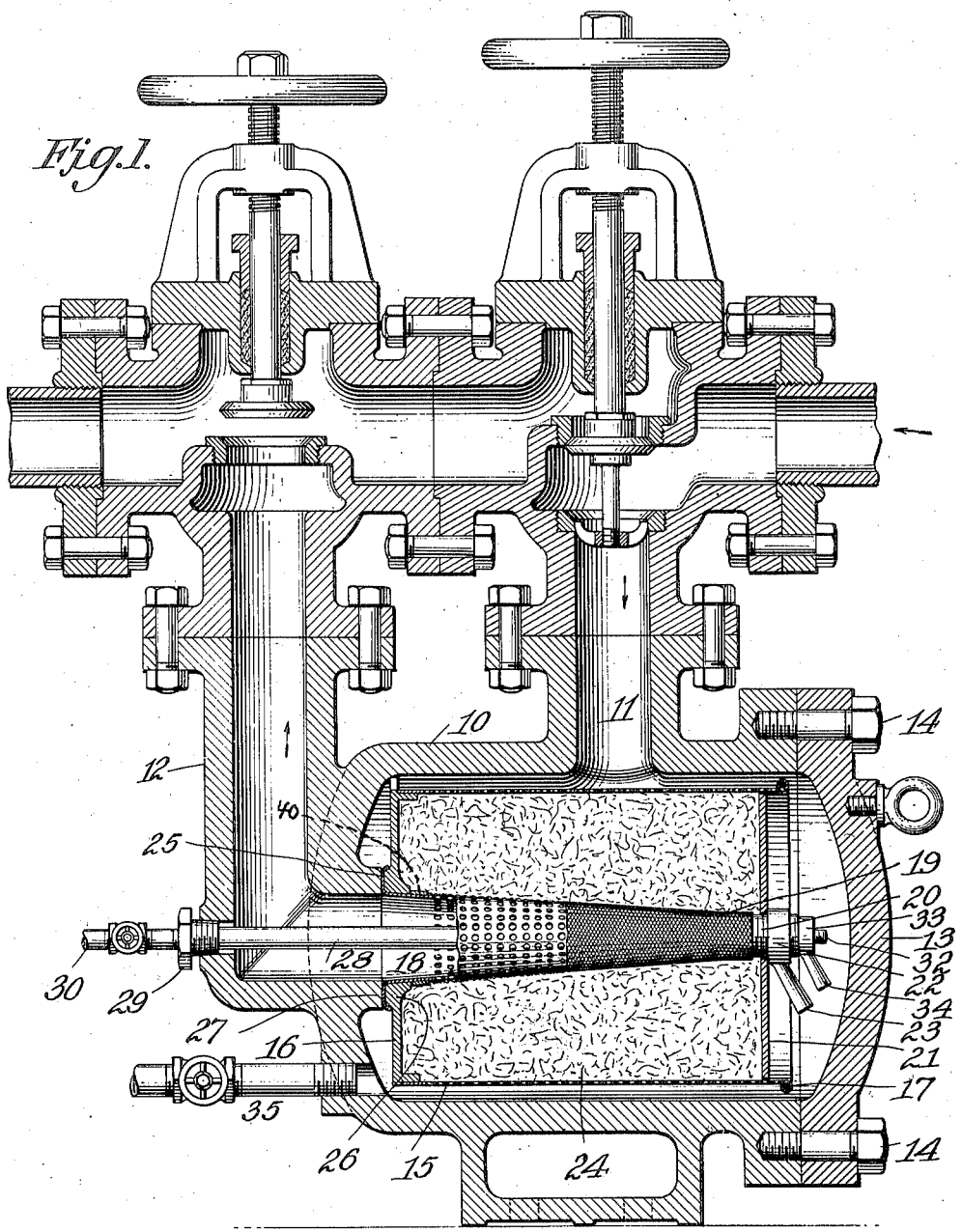

UNITED STATES PATENT OFFICE.

HOWARD C. DAVIS, OF ELIZABETH, NEW JERSEY, ASSIGNOR TO ROW & DAVIS, ENGINEERS, INC., OF NEW YORK, N. Y., A CORPORATION OF NEW YORK.

FEED-WATER FILTER AND GREASE-EXTRACTOR.

1,249,724.     Specification of Letters Patent.     Patented Dec. 11, 1917.

Application filed March 19, 1917. Serial No. 155,722.

*To all whom it may concern:*

Be it known that I, HOWARD C. DAVIS, a citizen of the United States, and a resident of Elizabeth, in the county of Union and State of New Jersey, have invented certain new and useful Improvements in Feed-Water Filters and Grease-Extractors, of which the following is a specification.

The object of the invention is, more particularly, to provide convenient, durable and highly efficient apparatus for filtering feed-water for steam generators, whereby impurities, including grease, in the water may be removed therefrom or arrested on the passage of the water through a bed of filtering material.

The apparatus embodying the invention comprises, in the preferred form, a main casing or body portion having inlet and outlet branch connections or nozzles and containing a perforated cylinder nearly as large as the interior chamber of said body, a tapered perforated tube extending axially through said cylinder and preferably covered with brass wire gauze, a tubular rod extending axially through said tapered tube, a body of filtering media filling said cylinder exterior to said tapered tube, a follower at one end of said cylinder to be pressed against said body of filtering media and properly hold the same within said cylinder and also permit of the convenient renewal of said media when desired, a steam inlet to the rod for use in boiling and washing the filtering media, convenient means for binding the stationary head of said cylinder against one end of the main body or casing of the apparatus, and convenient means for pressing the said follower against the body of filtering media, and said apparatus embodies other advantageous features of arrangement and construction, as hereinafter explained.

The invention will be fully understood from the detailed description hereinafter presented, reference being had to the accompanying drawings, in which:

Figure 1 is a central vertical section, partly broken away, through a filter constructed in accordance with and embodying the invention;

Fig. 2 is a corresponding view, on a larger scale, of the interior portions of the filter proper, some of the parts being broken away;

Fig. 3 is a vertical transverse section through the same, taken on the dotted line 3—3 of Fig. 2; and Fig. 4 is an end view of the same taken from the right hand end of Fig. 2.

In the drawings, 10 designates the body or main casing of the filter, and this body is cylindrical and cast in one piece with an inlet branch or nozzle connection 11 and an outlet branch or nozzle connection 12, and at one end the body 10 is fitted with a cover 13 which is secured in position by means of bolts 14.

Within the body 10 is mounted a perforated cylinder 15 having at one end a head 16 and at the other end being curled over at its edges upon a wire rod, as at 17, for strengthening purposes. Within the cylinder 15 is mounted a tapered perforated tube 18 which is preferably covered with brass wire gauze 19. The tube 18 is secured at its smaller end upon a threaded nipple 20, on which is mounted a plate follower 21 of disk outline occupying the diameter of the cylinder 15. Exterior to the follower 21, a nut 22 is applied upon the nipple 20, and this nut is formed with a suitable operating handle 23. Within the cylinder 15 and exterior to the tube 18 is a filling 24 of filtering media, which may be of cocoanut fiber or other suitable material,—preferably of oil absorbing nature, and the nut 22 is utilized for pressing the follower 21 against the filtering media 24 so that the filtering media may, with proper compactness, fill the cylinder 15. It will be obvious also that when the nut 22 and follower 21 are removed, the cylinder may be either emptied of its filtering material or filled with filtering material.

The larger end of the tube 18 is flanged over upon the head 16, as at 25, which head affords a shoulder 26 for this flanged over portion of the tube or of the metal of the tube. The shoulder 26 is annular and opposite a corresponding annular shoulder 27 cast with the main casing 10 so that when the parts of the apparatus are in operative position, the shoulders 26, 27 are in close relation and press between them the outwardly flanged portion 25 of the tube 18, thus creating a tight joint between the main chamber of the casing 10 and the tube 18.

Within the tube 18 and extending through the connection 12, is a tube or tubular rod 28 which is perforated within the tube 18, as shown in Fig. 2, and at its outer end is held by a nut bushing 29 and in communication with a valved live steam supply pipe 30. The inner end of the tube 28 has a plug 31 secured within it, and this plug has an exposed threaded end 32 adapted to receive a nut 33, which has an operating handle 34 and engages the end of the nipple 20. The tube or rod 28 passes within the nipple 20 and coöperates therewith in supporting the cylinder 15. The nut 33 on the threaded extension 32 of the tube or rod 28 serves the important purpose, when tightened against the outer end of the nipple 20, of forcing said nipple and tube 18 in a direction to force the head 16 of the cylinder against the shoulder 27 on the casing 10, thus not only binding the movable interior parts of the filter in position, but closing the joint between the shoulders 26, 27 so as to prevent the entrance of water to be filtered directly into the tube 18.

The inlet and outlet connections or nozzles 11, 12 have suitable valves connected with them to control the supply and delivery of the water, and these valves are clearly illustrated in Fig. 1 and being of standard construction do not require specific description. The water to be filtered will be admitted through the connection 11 into the general chamber of the casing 10 and pass thence through the filtering media 24 into the perforated tube 18, whence it will escape through the connection 12. The water may be reversed through the filtering media in which event it will enter through the connection 12 and pass thence into the tube 18 and then through the bed of filtering media, finding its escape through the connection 11. The casing 10 is provided with a valved blow-off connection 35 to be used when the interior parts of the filter are to be cleansed. The perforated tube 28, which also serves as a rod, is utilized for the admission of live steam to the interior of the tube 18 and body of the filtering material, this being for the purpose of boiling out and cleaning the filtering media without removing the same from the cylinder 15 or from the casing 10, and when the operation of cleaning the filtering media by the use of the steam is to be performed, the steam connection 30 and the blow-off pipe 35 are opened and the valves controlling the supply and exit of water to and from the casing 10 are closed. The action of the live steam on the filtering media is to cleanse the same and place it in condition for continued use in the operation of filtering. After the cleansing operation has been completed, the steam connection 30 and blow-off pipe 35 will be closed by means of their valves and the apparatus as a whole will be restored to operative condition.

There are several advantageous features connected with the filter, and one resides in the fact that when the cover 13 is removed and the nut 33 screwed off from the threaded extension 32 of the tubular rod 28, all of the interior mechanism of the casing 10 with the exception of said tube 28, may be bodily withdrawn from the apparatus, so as to receive any attention that it may require. If the filtering material 24 should require renewal, the nut 22 may be removed from the nipple 20 and thus leave the disk follower 21 free to be removed from the cylinder 15, whereupon the filtering material may be removed and fresh filtering material supplied, after which the follower 21 may be restored to position on the nipple 20 and the nut 22 replaced on said nipple and screwed up against said follower. The cylinder 15 with its parts may then be restored to the chamber of the casing 10, and thereupon the nut 33 will be restored to position and effect the binding of the head 16 of the cylinder 15 against the annular seat 27, as before. The head 13 will then be restored to position, closing the chamber of the casing 10.

I greatly prefer the employment of a perforated tube 18 of tapered form, as shown, and also the employment of wire gauze thereon, but I do not in every instance limit the invention to the tapering of the tube 18 and the securing thereon of the wire gauze, since the advantages incident to the application and removal of the cylinder 15 and its parts are not dependent on the tapering of the tube nor the presence of the gauze. I have illustrated a construction which has proven to be of great advantage in practical use, and desire to receive adequate protection for the same.

I have described my invention with reference to its use for purifying water to be employed for feeding boilers or steam generators, but I do not limit my invention to the use to which the filtered liquid may be applied.

The tube 18 is prevented from sliding out through the head 16 by a band 40 fastened to said tube.

What I claim as my invention and desire to secure by Letters-Patent, is:

1. In a filter of the character described, a body portion having an interior chamber and inlet and outlet connections, a perforated container mounted within said chamber, a perforated tube extending axially through said container and being in communication with one of said connections, a bed of filtering material within said container exterior to said tube, a plate follower closing one end of said container and adapted to engage the bed of filtering material, a threaded nipple secured to said tube and extending through said follower, and a nut on said nipple for engaging said follower and adjusting the same against said filtering material.

2. In a filter of the character described, a body portion having an interior chamber and inlet and outlet connections, a perforated container mounted within said chamber, a perforated tube extending axially through said container and being in communication with one of said connections, a bed of filtering material within said container exterior to said tube, a plate follower closing one end of said container and adapted to engage the bed of filtering material, a threaded nipple secured to said tube and extending through said follower, a nut on said nipple for engaging said follower and adjusting the same against said filtering material, a rod extending axially through said tube and having a threaded end within said chamber, and a nut on the threaded end of said rod adapted to engage the outer end of said nipple and bind the container against one end of said body, thereby forming a tight joint between said body and the open end of said tube.

3. In a filter of the character described, a body portion having an interior chamber and inlet and outlet connections, a perforated container within said chamber, a perforated tube extending axially through said container and being in communication with one of said connections, a bed of filtering material within said container exterior to said tube, a rod extending axially through said tube, and securing means on the end of said rod within said chamber adapted to bind said container against a rigid portion of said body so as to close the joint between said chamber and the open end of said tube, said rod being tubular and perforated within the aforesaid tube and being in communication with a source of steam supply for cleaning said filtering material, and said body having a blow-off pipe to be used during the process of cleansing the filtering material.

4. In a filter of the character described, a body portion having an interior chamber and inlet and outlet connections, a perforated container within said chamber, a perforated tube extending axially through said container and being in communication with one of said connections, a bed of filtering material within said container exterior to said tube, a rod extending axially through said tube, and having a threaded end within said chamber, a nut on the threaded end of said rod adapted to engage a part connected with said perforated tube for binding said cylinder against a rigid portion of said body so as to close the joint between said chamber and the open end of said tube.

5. In a filter of the character described, a body portion having an interior chamber and inlet and outlet connections, a perforated container mounted within said chamber, a perforated tube extending axially through said container and being in communication with one of said connections, a bed of filtering material within said container exterior to said tube, a rod extending axially through said tube and rigidly held at its outer end and being threaded at its inner end, and means on the threaded end of said rod for securing the container on said rod and binding the container at the open end of said tube against a solid part of said body, said body having a removable end-cover permitting of the withdrawal of said container and tube when desired.

6. In a filter of the character described, a body portion having an interior chamber and inlet and outlet connections, a perforated container mounted within said chamber, a perforated tube extending axially through said container and being in communication with one of said connections, a bed of filtering material within said container exterior to said tube, a rod extending axially through said tube and rigidly held at its outer end and being threaded at its inner end, and means on the threaded end of said rod for securing the container on said rod and binding the container at the open end of said tube against a solid part of said body, said body having a removable end-cover permitting of the withdrawal of said container and tube when desired, and said rod being tubular and perforated within the aforesaid tube and in communication with a source of supply for steam.

Signed at New York city, in the county of New York and State of New York, this 17th day of March, A. D. 1917.

HOWARD C. DAVIS.

Witnesses:
 ARTHUR MARION,
 CHAS. C. GILL.